United States Patent
Martin et al.

(10) Patent No.: US 9,154,366 B1
(45) Date of Patent: Oct. 6, 2015

(54) SERVER MAINTENANCE MODELING IN CLOUD COMPUTING

(75) Inventors: Justin A. Martin, Olathe, KS (US); Brian John Washburn, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 526 days.

(21) Appl. No.: 13/326,184

(22) Filed: Dec. 14, 2011

(51) Int. Cl.
    G06F 15/173    (2006.01)
    H04L 29/08     (2006.01)

(52) U.S. Cl.
    CPC ............................... H04L 29/08072 (2013.01)

(58) Field of Classification Search
    CPC ... G06Q 30/0255; G06Q 10/04; H04M 15/58; H04M 2215/0188; H04M 2215/815; G06N 3/126; H04L 41/147; H04L 43/04; H04L 41/0681; H04L 47/823
    USPC ........................................................ 709/224
    See application file for complete search history.

(56) References Cited

U.S. PATENT DOCUMENTS

| | | | |
|---|---|---|---|
| 6,393,480 B1 | 5/2002 | Qin et al. | |
| 6,820,042 B1 | 11/2004 | Cohen et al. | |
| 6,973,415 B1 * | 12/2005 | Saghier et al. | 702/186 |
| 7,082,381 B1 * | 7/2006 | Saghier et al. | 702/182 |
| 7,197,428 B1 | 3/2007 | Saghier et al. | |
| 7,243,049 B1 | 7/2007 | Saghier et al. | |
| 7,296,256 B2 | 11/2007 | Liu et al. | |
| 7,369,967 B1 | 5/2008 | Washburn et al. | |
| 7,412,492 B1 | 8/2008 | Waldspurger | |
| 7,454,464 B2 | 11/2008 | Puthenkulam et al. | |
| 7,464,224 B2 * | 12/2008 | Kano | 711/114 |
| 7,680,916 B2 | 3/2010 | Barnett et al. | |
| 7,890,473 B1 * | 2/2011 | Wyett et al. | 707/688 |
| 7,934,108 B2 * | 4/2011 | Radhakrishnan et al. | 713/300 |
| 7,937,473 B2 | 5/2011 | Nakadai | |
| 7,962,916 B2 | 6/2011 | Ramanathan | |
| 8,005,644 B1 | 8/2011 | Evans et al. | |
| 8,069,240 B1 | 11/2011 | Ybarra, III | |
| 8,201,180 B2 | 6/2012 | Briscoe et al. | |
| 8,296,424 B2 | 10/2012 | Malloy et al. | |
| 8,423,646 B2 | 4/2013 | Jamjoom et al. | |

(Continued)

OTHER PUBLICATIONS

Davis, David, "What is the Best Performance Monitoring Application for VMware ESX Server", Jan. 2009, www.petri.com, All Pages.*

(Continued)

*Primary Examiner* — Douglas Blair
*Assistant Examiner* — Imran Moorad (57) ABSTRACT

A method of modeling and analyzing load across servers in a cloud computing environment. The method comprises analyzing a processor, a memory, and an input/output utilization of each of a plurality of servers, where each server is comprised of at least one logical partition. A chart displaying a usage pattern is presented for each server. A list of logical partitions is presented for each server of the plurality of servers. A selection of at least one logical partition on a first server of the plurality of servers and a selection of a second server of the plurality of servers is received. The utilization impacts of moving the logical partition to the selected second server are modeled and an updated chart displaying the usage pattern for each server based on the modeled migration of the logical partition is presented. The modeled optimal location stored in a disaster recovery plan.

18 Claims, 4 Drawing Sheets

(56) References Cited

U.S. PATENT DOCUMENTS

| | | |
|---|---|---|
| 8,429,276 B1 | 4/2013 | Kumar et al. |
| 8,606,905 B1 | 12/2013 | Martin et al. |
| 8,825,858 B1 | 9/2014 | Atchity et al. |
| 2004/0221290 A1 | 11/2004 | Casey et al. |
| 2005/0289308 A1* | 12/2005 | Kano ............................ 711/161 |
| 2006/0085541 A1 | 4/2006 | Cuomo et al. |
| 2007/0130423 A1* | 6/2007 | Liu et al. ...................... 711/114 |
| 2007/0168494 A1 | 7/2007 | Liu et al. |
| 2008/0022277 A1* | 1/2008 | Kano ............................... 718/1 |
| 2008/0172554 A1* | 7/2008 | Armstrong et al. ............... 713/2 |
| 2009/0157870 A1 | 6/2009 | Nakadai |
| 2009/0259737 A1 | 10/2009 | Aikoh et al. |
| 2009/0271485 A1* | 10/2009 | Sawyer et al. ................ 709/206 |
| 2010/0250746 A1 | 9/2010 | Murase |
| 2011/0055470 A1* | 3/2011 | Portolani ...................... 711/108 |
| 2011/0213997 A1 | 9/2011 | Kansal et al. |
| 2011/0276675 A1* | 11/2011 | Singh et al. ................... 709/223 |
| 2012/0297238 A1* | 11/2012 | Watson et al. ............... 714/4.11 |
| 2012/0303322 A1* | 11/2012 | Rego et al. .................... 702/182 |

OTHER PUBLICATIONS

Notice of Allowance dated Aug. 6, 2013, U.S. Appl. No. 12/900,154, filed Oct. 7, 2010.

Martin, Justin A., et al., Patent Application entitled "Automated Determination of System Scalability Constraint Factors", filed Oct. 7, 2010, U.S. Appl. No. 12/900,154.

FAIPP Pre-Interview Communication dated May 24, 2013, U.S. Appl. No. 12/900,154, filed Oct. 7, 2010.

Notice of Allowance dated Apr. 21, 2014, U.S. Appl. No. 12/939,742, filed Nov. 4, 2010.

Atchity, Gregory J., et al., Patent Application entitled, "Virtual Server Resource Monitoring and Management".

Atchity, Gregory J., et al., Patent Application entitled, "Virtual Server Resource Monitoring and Management" filed Nov. 4, 2010, U.S. Appl. No. 12/939,742.

FAIPP Pre-Interview Communication dated Jan. 22, 2014, U.S. Appl. No. 12/939,742, filed Nov. 4, 2010.

* cited by examiner

SERVER MAINTENANCE MODELING IN CLOUD COMPUTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud computing is the delivery of computing as a service where shared resources, software, and information are provided to computers and other devices over a network. Cloud computing provides computation, software, data access, and data storage services that do not require end-user knowledge of the physical location of the system that delivers the services. Many cloud computing infrastructures consist of services delivered through shared data centers and appearing as a single point of access for users' computing needs. Data centers may consist of a plurality of servers and typically utilize dynamically scalable and often virtualized servers.

SUMMARY

In an embodiment, a method of modeling and analyzing load across servers in a cloud computing environment is disclosed. The method comprises analyzing a processor utilization, a memory utilization, and an input/output utilization of each of a plurality of servers, where each server is comprised of at least one logical partition. A chart displaying a usage pattern is presented for each server of the plurality of servers. A list of logical partitions is presented for each server of the plurality of servers. A selection of at least one logical partition on a first server of the plurality of servers and a selection of a second server of the plurality of servers is received. The utilization impacts of moving the logical partition to the selected second server are modeled and an updated chart displaying the usage pattern for each server based on the modeled migration of the logical partition is presented.

In an embodiment, a method of disaster recovery planning for virtual servers in a cloud computing environment is disclosed. The method comprises analyzing a processor utilization, a memory utilization, and an input/output utilization of each of a plurality of servers, where each server is comprised of at least one logical partition. The utilization impacts of moving the logical partition from a first server in the plurality of servers to each of the other servers in the plurality of servers is modeled based on the analyzing. The optimal location for the logical partition is determined based on the utilization impacts across the plurality of servers to move the logical partition in the event of an outage of the first server. The modeled optimal location is stored in a disaster recovery plan.

In an embodiment, a method of modeling and analyzing load across servers in a cloud computing environment is disclosed. The method comprises analyzing a processor utilization, a memory utilization, and an input/output utilization of each or a plurality of servers, where each server is comprised of at least one logical partition. A chart displaying a usage pattern is presented for each server of the plurality of servers. An input of a logical partition to be added to the cloud computing environment and a selection of a server is received. The utilization impacts of adding the logical partition to the selected server are modeled and an updated chart displaying the usage pattern for each server based on the modeled addition of the logical partition is presented.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A cloud computing environment may be comprised of a plurality of servers grouped together as a server farm. A server farm is a grouping of servers used to accomplish server needs beyond the capability of one server. Each server may be comprised of one or more logical partitions (LPARs), which divide the hardware resources of the server to provide separate virtual computers. A logical partition is a subset of a computer's hardware resources, virtualized as a separate computer. A physical machine or server may be partitioned into multiple logical partitions, each hosting a separate operating system and performing separate functions. Logical partitions safely allow multiple applications to run on the same server and offer advantages such as lower costs, faster deployment, and convenience through sharing the hardware resources.

An application or service, such as a server for a web site used in a cloud computing environment, may be spread across one or more logical partitions to balance the load and provide redundancy in case of hardware failures. Management of these logical partitions and server performance can become an ongoing issue and require continued maintenance. The present disclosure teaches a solution with the ability to model the utilization patterns associated with the migration and addition of logical partitions across the servers in a server farm. The solution further simplifies this maintenance and provides a view into how to optimize the distribution of logical partitions in the server farm.

Modeling the utilization patterns of servers and logical partitions in a cloud computing environment includes a computer analyzing the processor utilization, the memory utilization, and the input/output utilization, allowing an administrator to generate a view of what would happen to utilization patterns if a logical partition is moved to another server or a new logical partition is added. For example, if spikes in the processor utilization for a server are being seen between 9:00 am and 11:00 am on weekdays, the administrator can investigate the utilization of the logical partitions on the server and model a "what if" analysis on the effects of moving a logical partition to another server. If the analysis shows that the spikes are better accommodated on the new server, the administrator may then execute the move of the logical partition knowing the expected effects on both the new server and the former server.

In addition to analyzing the processor utilization after moving the logical partition, the administrator would also have the ability to cross check the memory utilization and input/output utilization on the server to which the logical partition is being migrated and verify that no utilization issues are created by the move. For example, upon modeling the effects of moving the logical partition and seeing the modeled processor utilization reduces the previous spikes, the administrator may model the memory utilization on the server and discover moving the logical partition, while improving the processor utilization, may exceed the available memory for the server.

Modeling the utilization patterns of servers and logical partitions may also be used to periodically load balance utilization across the servers in a server farm. Over the course of time, usage patterns of applications and services provided by a logical partition may change, resulting in changes to loads on the servers where the logical partitions reside. To proactively respond to these changing conditions, a periodic balancing across the servers may be scheduled using the ability to model the utilization patterns to facilitate balancing the loads. In an embodiment, a load balancing algorithm may also be built into the analysis to recommend a list of steps to take to balance the load across the server farm. In an embodiment, the balancing could further be scheduled to execute automatically following the completion of the load balancing algorithm. Alternatively, the load balancing algorithm could be run automatically, but the movement of the partitions to facilitate the balancing of the load would not take place without confirmation or override from an administrator following a review of the analysis.

Disaster recovery is another area which may benefit from modeling the utilization patterns. The utilization patterns of moving a logical partition in the event of an outage to another server in the server farm could be modeled. This data may be used to identify the preferred location to migrate the logical partition, which can then be stored in a disaster recovery plan and referenced during an outage. Repeating this process for each logical partition on the server and each server in the server farm would produce a plan detailing recovery steps for any server in the server farm in the event an outage occurs. In an embodiment, an outage of a first server in the server farm results in the execution of the disaster recovery plan of the first server by moving each of the existing logical partitions from the first server to another server in the server farm best able to accommodate the load. The disaster recovery plan may also be automated to execute the move of the logical partitions from the first server upon detecting the outage of the first server.

Figure 1:
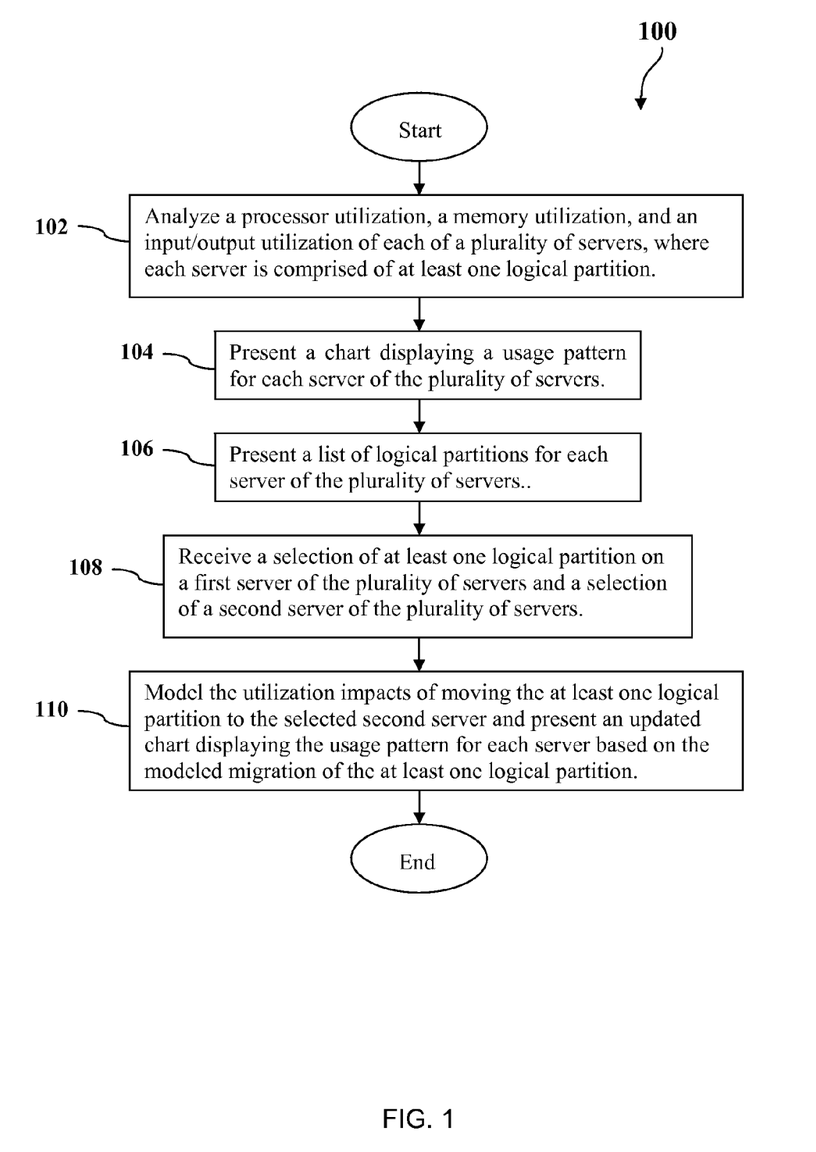
FIG. 1 is a flow chart of a method of managing data communication network inventory according to an embodiment of the disclosure.

Turning now to FIG. 1, a method 100 of modeling and analyzing load across servers in a cloud computing environment is described. At block 102, a processor utilization, a memory utilization, and an input/output utilization for each of a plurality of servers is analyzed by a computer, where each server is comprised of at least one logical partition. The processor utilization, memory utilization, and input/output utilization may be analyzed at the logical partition level as well as the server level. At block 104, a chart is presented on the computer displaying a usage pattern for each server of the plurality of servers. The chart shows the usage pattern over time for each server, with the ability to select the processor utilization, memory utilization, or input/output utilization to display and the time frame over which to display the usage, such as daily, weekly, or monthly. The chart may display the processor utilization, memory utilization, or input/output utilization for each server of the plurality of servers. At block 106, a list of logical partitions is presented for each server in the plurality of servers. The logical partitions are presented in a list, by server, with the ability to select logical partitions from the list for modeling. At block 108, a selection of at least one logical partition on a first server of the plurality of servers and a selection of a second server of the plurality of servers is received from a user. The selection of the logical partition and the selection of the second server are used to model the migration of the logical partition to the second server. At block 110, the utilization impacts of moving the logical partition to the selected second server are modeled and an updated chart is presented displaying the usage pattern for each server based on the modeled migration of the logical partition. The updated chart provides a graphical view to easily see the utilization impacts that would be expected if the logical partition is moved. The impact to each of the servers in the plurality of servers can be seen in the updated chart.

In an embodiment, modeling the utilization impacts of moving the logical partition comprises a computer solving an algorithm for the balancing of processor utilization, memory utilization, and input/output utilization on the first and second servers. The algorithm may calculate the current utilization for the logical partition, the reduced utilization for the first server, and the increased utilization for the second server for displaying the updated usage patterns in the chart. In an embodiment, the method 100 further comprises receiving a selection of a second logical partition on the first server and a selection of a third server of the plurality of servers and modeling the utilization impacts of moving the second logical partition to the selected third server and presenting an updated chart displaying the usage pattern for each server based on the modeled migration of the second logical partition. To balance the load across the servers it may be needed to move more than one logical partition off of the first server, and the second server may not be able to support the second logical partition or it may not result in a balanced load. The second logical partition can be modeled on the third server and an updated chart presented to display the usage pattern for each server with the modeled changes.

In an embodiment, analyzing the processor utilization comprises comparing the currently entitled logical partition processor usage, free entitlement capacity, average additional processor usage, and planned logical partition processor usage against the processor capacity of the server. The currently entitled logical partition processor usage is the guaranteed processor cycles the logical partition will get at any point in time. The total entitled processor usage for all logical partitions on a server cannot exceed the number of physical processors in that server. More plainly, the server's processors cannot be oversubscribed by the total of the entitlements.

This means every logical partition on the server will always be able to use its entitled capacity at any point in time. Additionally, the logical partition may be able to borrow unused processor cycles from server processor capacity that has not been assigned to a logical partition and from other logical partitions that are not currently using their full entitled capacity. However, the logical partition may be forced back down to its entitled capacity if another logical partition requires the borrowed capacity.

The free entitlement capacity is the processor capacity on the server that has not been assigned to a logical partition. The average additional processor usage is the processor usage that exceeds the entitled capacity for the logical partitions on the server. As described above, the average additional processor usage is the average borrowed processor usage from available processor cycles that is above the entitled capacity for the logical partition. This may provide an indication that a logical partition is in need of more entitled capacity. The planned logical partition processor usage is the entitlement capacity of logical partitions that are planned but are not yet implemented on the server. For example, when an administrator selects a server to have the processor utilization analyzed, a computer program will determine the guaranteed processor cycles for each logical partition on the server, the average additional processor usage for each logical partition on the server, the guaranteed processor cycles assigned to logical partitions that have been planned but not yet implemented on the server, and the remaining free processor capacity that has not been assigned to a logical partition. This data will then be used by the program to present a chart to provide the administrator with a graphical view of the processor utilization of the server.

In an embodiment, analyzing the memory utilization comprises comparing the currently used memory, free memory, firmware memory usage, and planned logical partition memory usage against the memory capacity of the server. The currently used memory is the memory used by logical partitions running on the server. The firmware memory usage is the memory dedicated to the virtualization overhead of the logical partitions running on the server. Virtualization overhead is the memory and processor resources needed to run the hypervisor firmware for the logical partitions. The hypervisor handles time slicing and dispatching for the logical partition workloads between processors. The free memory is the memory not currently in use on the server. The planned logical partition memory usage is the memory allocated for logical partitions which are planned but not yet built on the server.

In an embodiment, each server in the plurality of servers comprises at least one virtual input/output logical partition which may handle input/output for all logical partitions on the server. A virtual input/output logical partition allows the input/output resources on the server to be shared among logical partitions on the server. A logical partition with dedicated input/output resources would be limited to the capacity of the input/output hardware assigned to the logical partition. Analyzing the input/output utilization comprises comparing the input/output utilization on the virtual input/output logical partition against the input/output capacity of the server. Utilizing a virtual input/output logical partition allows logical partitions to be moved between servers. Because dedicated physical input/output resources are not used, logical partitions may be migrated between servers and assigned to use the virtual input/output logical partition on the new server.

In an embodiment, logical partitions which do not utilize the virtual input/output logical partition for input/output are not able to be moved between servers. Logical partitions which utilize dedicated physical resources are not able to be migrated because the physical resources are part of the server and therefore prevent the move. In an embodiment, the method 100 further comprises periodically modeling the utilization impacts of moving logical partitions between servers in the plurality of servers to balance the load across the plurality of servers. Due to changes in load between applications running on logical partitions and across servers, the need to rebalance the load over time becomes an important consideration which the modeling provided by the method 100 addresses in an efficient manner that can be repeated on a regular basis.

Figure 2:
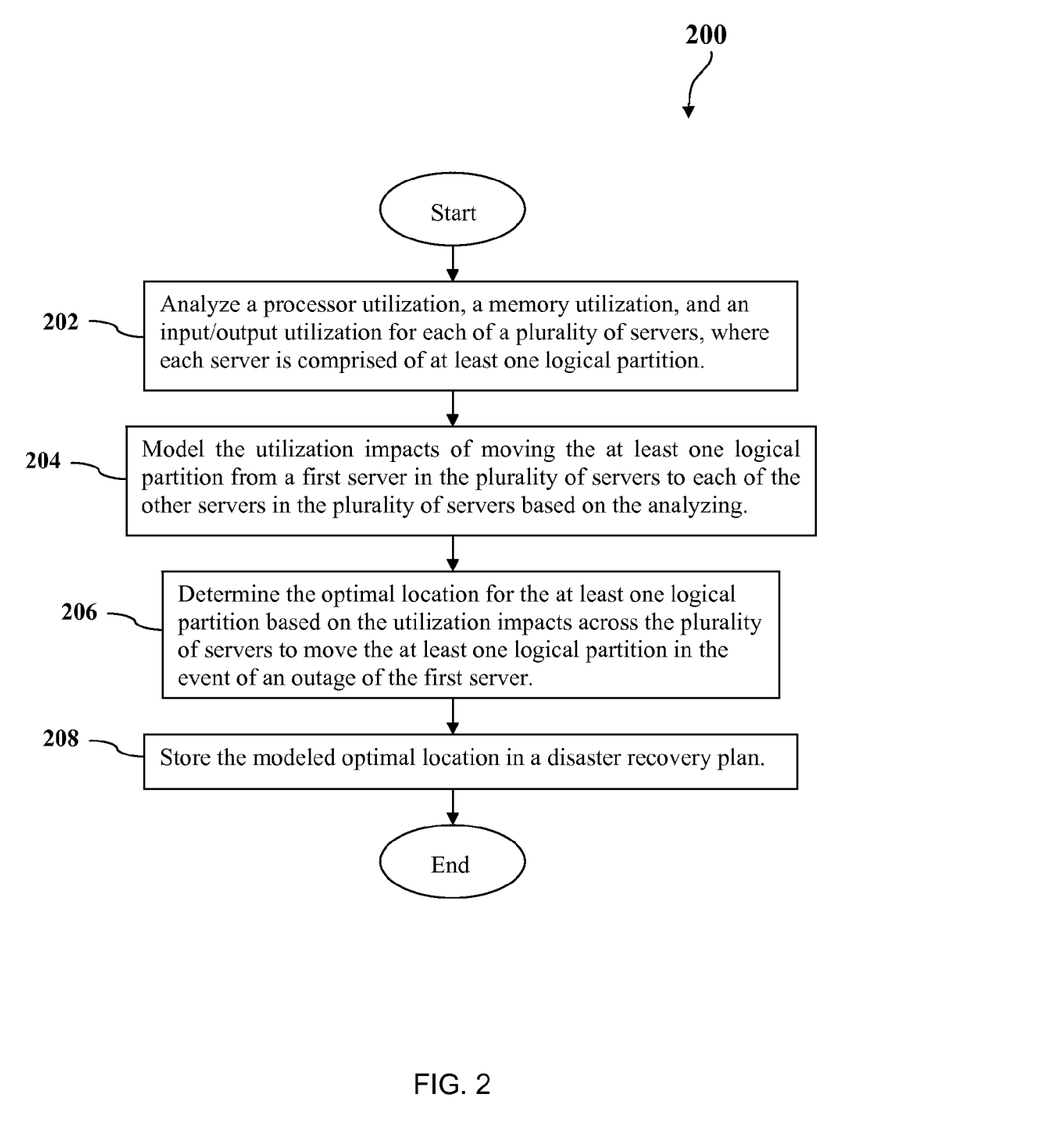
FIG. 2 is a flow chart of a method managing data communication network inventory according to an embodiment of the disclosure.

Turning now to FIG. 2, a method 200 of disaster recovery planning for virtual servers in a cloud computing environment is disclosed. At block 202, a processor utilization, a memory utilization, and an input/output utilization for each of a plurality of servers is analyzed by a computer, where each server is comprised of at least one logical partition. The utilization data for each server in the plurality of servers is analyzed to understand the usage patterns compared to the server capacity. At block 204, the utilization impacts of moving the logical partition from a first server in the plurality of servers to each of the other servers are modeled by the computer based on the analyzing. The analyzed utilization data is used to model the impact of moving the logical partition from the first server to each of the other servers and provide a view of the utilization after the logical partition is moved. At block 206, the optimal location to move the logical partition in the event of an outage of the first server is determined based on the utilization impacts across the plurality of servers. Once the utilization impacts across the plurality of servers have been modeled, this information can be used to determine the best location to migrate the logical partition to in the event of an outage. The best location to migrate the logical partition may be based on ensuring that the migrated logical partition does not exceed the available capacities on the new server, or that the server has the most available capacity prior to the migration. At block 208, the modeled optimal location is stored in a disaster recovery plan. Storing the optimal location in a disaster recovery plan allows for quickly restoring the logical partition to a location that is modeled to be capable of handling the increased load. Because the analysis is completed in advance of the outage and the optimal location stored in the disaster recovery plan, the recovery can begin promptly following the disaster.

In an embodiment, the plurality of servers comprise a server farm. A server farm is a collection of computer servers used to accomplish server needs beyond the capability of one machine. Server farms often have backup servers or extra capacity that may take over the function of the primary servers in the event of a failure. The servers in the server farm may be architected in such a way to facilitate the migration of logical partitions between servers as necessary for load balancing or failures. In an embodiment, the method 200 further comprises periodically updating the modeled optimal location in the disaster recovery plan based on changes in utilization across the plurality of servers. Over time, utilization patterns on individual servers in the plurality of servers may change as new logical partitions are created and load on existing partitions fluctuates. To account for variances of utilization and to allow a quick response during a server outage, the disaster recovery plan is periodically updated to reflect existing conditions and changes. Based on the importance of the applications running on the plurality of servers, the disaster recovery plan may be updated monthly, quarterly, or some other pre-defined interval.

In an embodiment, the method 200 further comprises, for each server in the server farm, modeling the utilization impacts of moving the logical partition from the current server in the plurality of servers to each of the other servers based on the analyzing, determining the optimal location for the logical partition based on the utilization impacts across the plurality of servers to move the logical partition in the event of an outage of the current server, and storing the modeled optimal location for the logical partition on the current server in the disaster recovery plan. To prepare for outage scenarios across the server farm, the disaster recovery plan may be designed to evaluate each logical partition on each server to determine the optimal migration location. The disaster recovery plan should include solutions in the event of an outage of any of the servers in the server farm.

Figure 3:
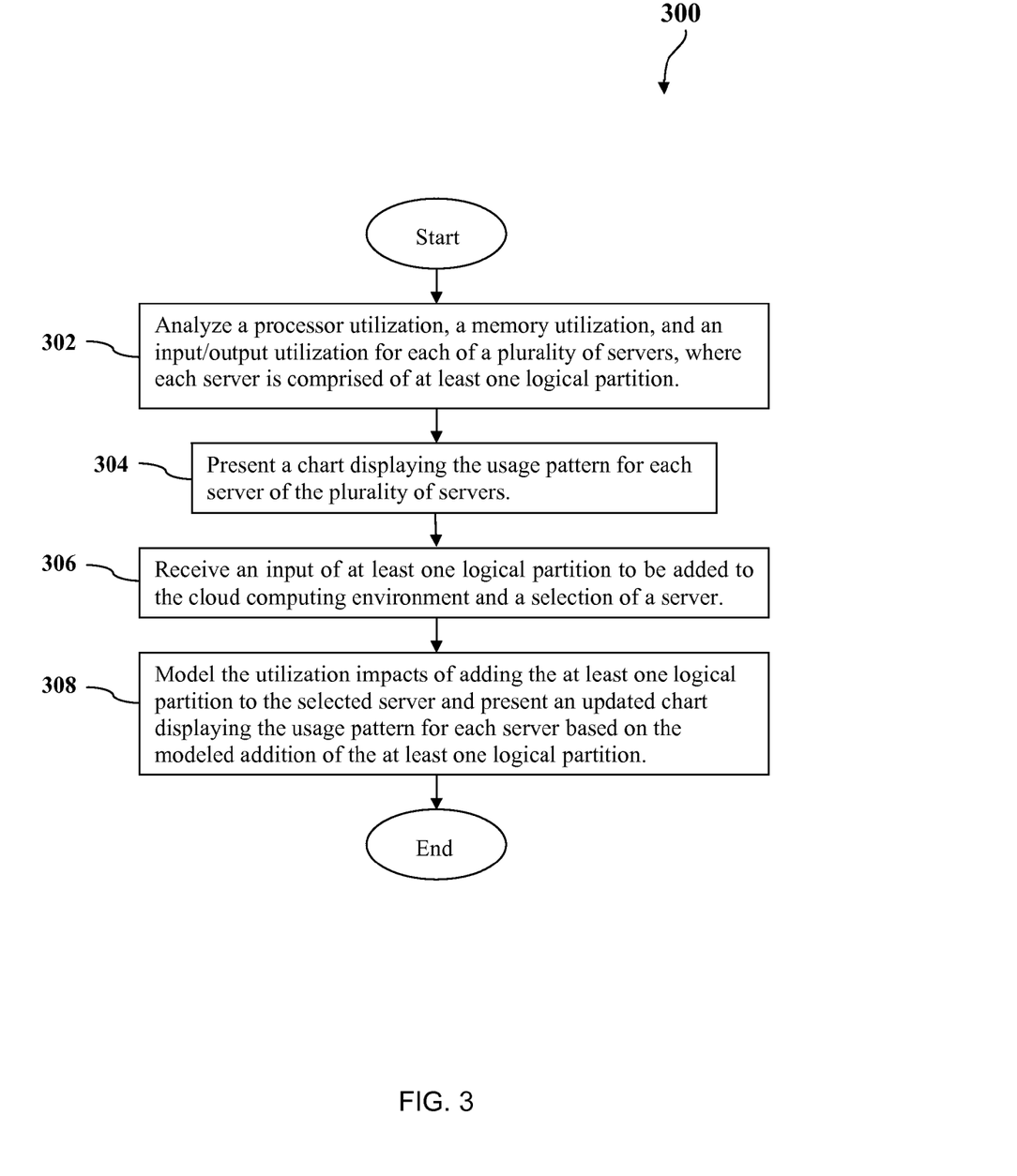
FIG. 3 is a flow chart of a method managing data communication network inventory according to an embodiment of the disclosure.

Turning now to FIG. 3, a method 300 of modeling and analyzing load across servers in a cloud computing environment is described. At block 302, a processor utilization, a memory utilization, and an input/output utilization for each of a plurality of servers is analyzed by a computer, where each server is comprised of at least one logical partition. The utilization data for each server in the plurality of servers is analyzed to understand the usage patterns compared to the server capacity. At block 304, a chart is presented on the computer displaying the usage pattern for each server of the plurality of servers. The chart shows the usage pattern over time for each server, with the ability to select the time frame and the utilization type to display. The chart may display the processor utilization, memory utilization, or input/output utilization for each server of the plurality of servers. At block 306, an input of a logical partition to be added to the cloud computing environment and a selection of a server is received. The added logical partition and the selection of the server are used to model the addition of the logical partition. At block 308, the utilization impacts of adding the logical partition to the selected server are modeled, and an updated chart is presented displaying the usage pattern for each server based on the modeled addition of the logical partition. The updated chart provides a graphical view to easily see the utilization impacts that would be expected if the logical partition is added to the selected server. The impact to each of the servers in the plurality of servers can be seen in the updated chart.

In an embodiment, the method 300 further comprises modeling the utilization impacts of adding the logical partition individually to each server in the plurality of servers, one at a time. Modeling the impacts of adding the logical partition to each server in the plurality of servers would allow the user to compare the effects of the addition on each server and ensure they have the information needed to decide where to add the new logical partition. In an embodiment, the plurality of servers comprise a server farm. Server farms often have backup servers or extra capacity that may take over the function of the primary servers in the event of a failure. Modeling the utilization impacts of adding the logical partition to each server in a server farm may allow the user to determine which server in the server farm can best handle the additional load of the new logical partition.

In an embodiment, analyzing the processor utilization comprises comparing the currently entitled logical partition processor usage, free entitlement capacity, average additional processor usage, and planned logical partition processor usage against the processor capacity of the server. Modeling the processor utilization may allow an understanding of the impacts of adding the logical partition to help determine the server with the processor capacity to handle the load of the additional logical partition. In an embodiment, analyzing the memory utilization comprises comparing the currently used memory, free memory, firmware memory usage, and planned logical partition memory usage against the memory capacity of the server. Modeling the memory utilization may allow an understanding of the impacts of adding the logical partition to help determine the server with the memory capacity to handle the load of the additional logical partition.

In an embodiment, each server in the plurality of servers comprises at least one virtual input/output partition which handles input/output for all logical partitions on the server, and analyzing the input/output utilization comprises comparing the input/output utilization on the virtual input/output logical partition against the input/output capacity of the server. The input/output for each logical partition is routed through the virtual input/output partition therefore the total input/output utilization can be measured by the utilization of the virtual input/output partition. This input/output utilization can be compared against the input/output capacity of the server when modeling and analyzing the load across the servers.

In an embodiment, the method 300 further comprises presenting a graph containing a plurality of servers comprising a server farm and a summary of utilization for each server in the graph. The graph provides a visual means to see and compare the utilization for all servers in a server farm in one location, where the utilization for each server is the summation of the utilization for all logical partitions on the server. In an embodiment, the method 300 further comprises presenting a graph containing a plurality of server farms and a summary of utilization for each server farm in the graph. The graph provides a visual means to see and compare utilization for multiple server farms, where the utilization for each server farm is the summation of the utilization for all servers in the server farm. The graphs may be used to quickly analyze the load of the server farms and determine which server farms to investigate further when loads are approaching thresholds that may affect performance.

Figure 4:
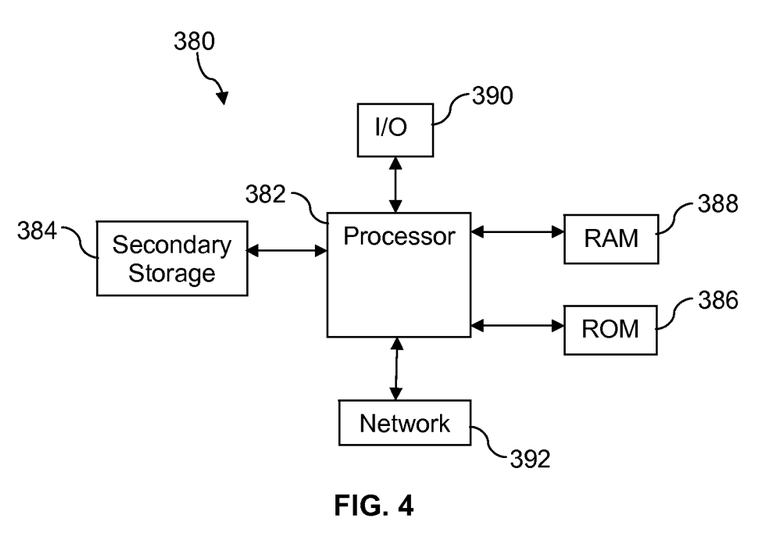
FIG. 4 illustrates an exemplary computer system suitable for implementing the several embodiments of the disclosure.

FIG. 4 illustrates a computer system 380 suitable for implementing one or more embodiments disclosed herein. The computer system 380 may execute one or more applications that perform one or more of the methods 100, 200, 300 described above. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of modeling and analyzing load across servers in a cloud computing environment, comprising:
   analyzing, by a computer system, a processor utilization, a memory utilization, and an input/output utilization of each of a plurality of servers, wherein each server is comprised of at least one logical partition, and wherein the at least one logical partition is a subset of the corresponding server's hardware resources including a physical processor and a physical memory, virtualized as a separate server, and wherein analyzing the processor utilization comprises comparing the currently entitled logical partition processor usage, free entitlement capacity, average additional processor usage, and planned logical partition processor usage against the processor capacity of the server;
   presenting a chart displaying a usage pattern for each server of the plurality of servers;
   presenting a list of logical partitions for each server of the plurality of servers;
   receiving a user selection of at least one logical partition on a first server of the plurality of servers and a user selection of a second server of the plurality of servers;
   modeling, by the computer system, the utilization impacts of moving the at least one logical partition on the first server to the user selected second server and presenting an updated chart to a user, wherein the updated chart displays the usage pattern for each server based on the modeled migration of the at least one logical partition to the user selected second server and displays user selectable display options including any of the processor utilization, the memory utilization, or the input/output utilization; and
   based at least on presenting the updated chart, receiving a user selection of at least one server of the plurality of servers to which to move the at least one logical partition.

2. The method of claim 1, wherein modeling the utilization impacts of moving the logical partition comprises solving an algorithm for the balancing of processor utilization, memory utilization, and input/output utilization on the first and second servers.

3. The method of claim 1, further comprising:
   receiving a selection of a second logical partition on the first server and a selection of a third server of the plurality of servers; and
   modeling the utilization impacts of moving the second logical partition to the selected third server and presenting an updated chart displaying the usage pattern for each server based on the modeled migration of the second logical partition.

4. The method of claim 1, wherein analyzing the memory utilization comprises comparing the currently used memory, free memory, firmware memory usage, and planned logical partition memory usage against the memory capacity of the server.

5. The method of claim 1, wherein each server in the plurality of servers comprises at least one virtual input/output logical partition which may handle input/output for all logical partitions on the server, and wherein analyzing the input/output utilization comprises comparing the input/output utilization on the at least one virtual input/output logical partition against the input/output capacity of the server.

6. The method of claim 5, wherein logical partitions which do not utilize the at least one virtual input/output logical partition for input/output are not able to be moved between servers.

7. The method of claim 1, further comprising periodically modeling utilization impacts of moving logical partitions between servers in the plurality of servers to balance the load across the plurality of servers.

8. A method of disaster recovery planning for virtual servers in a cloud computing environment, comprising:
   analyzing, by a computer system, a processor utilization, a memory utilization, and an input/output utilization of each of a plurality of servers, wherein each server is comprised of at least one logical partition, and wherein the at least one logical partition is a subset of the corresponding server's hardware resources including a physical processor and a physical memory, virtualized as a separate server, and wherein analyzing the processor utilization comprises comparing the currently entitled logical partition processor usage, free entitlement capacity, average additional processor usage, and planned logical partition processor usage against the processor capacity of the server;
   modeling, by the computer system, the utilization impacts of moving the at least one logical partition from a first server in the plurality of servers to each of the other servers in the plurality of servers based on the analyzing;
   determining the optimal location for the at least one logical partition based on the utilization impacts across the plurality of servers to move the at least one logical partition in the event of an outage of the first server; and storing the modeled optimal location in a disaster recovery plan.

9. The method of claim 8, wherein the plurality of servers comprise a server farm.

10. The method of claim 9, further comprising:
for each remaining server in the server farm:
  modeling the utilization impacts of moving the at least one logical partition from the current server in the plurality of servers to each of the other servers based on the analyzing,
  determining the optimal location for the at least one logical partition based on the utilization impacts across the plurality of servers to move the at least one logical partition in the event of an outage of the current server, and
  storing the modeled optimal location for the at least one logical partition on the current server in a disaster recovery plan.

11. The method of claim 8, further comprising periodically updating the modeled optimal location in the disaster recovery plan based on changes in utilization across the plurality of servers.

12. A method of modeling and analyzing load across servers in a cloud computing environment, comprising:
analyzing, by a computer system, a processor utilization, a memory utilization, and an input/output utilization for each of a plurality of servers, wherein each server is comprised of at least one logical partition, and wherein the at least one logical partition is a subset of the corresponding server's hardware resources including a physical processor and a physical memory, virtualized as a separate server, and wherein analyzing the processor utilization comprises comparing the currently entitled logical partition processor usage, free entitlement capacity, average additional processor usage, and planned logical partition processor usage against the processor capacity of the server;
presenting a chart displaying the usage pattern for each server of the plurality of servers;
receiving an input of at least one logical partition to be added to the cloud computing environment and a user selection of a server of the plurality of servers;
modeling, by the computer system, the utilization impacts of adding the at least one logical partition to the user selected server and presenting an updated chart to a user, wherein the updated chart displays the usage pattern for each server based on the modeled addition of the at least one logical partition to the user selected server and displays user selectable options including any of the processor utilization, the memory utilization, or the input/output utilization; and
based at least on presenting the updated chart, receiving a user selection of at least one server of the plurality of servers to which to add the at least one logical partition.

13. The method of claim 12, further comprising modeling the utilization impacts of adding the at least one logical partition to each server in the plurality of servers.

14. The method of claim 12, wherein analyzing the memory utilization comprises comparing the currently used memory, free memory, firmware memory usage, and planned logical partition memory usage against the memory capacity of the server.

15. The method of claim 12, wherein each server in the plurality of servers comprises at least one virtual input/output logical partition which handles input/output for all logical partitions on the server, and wherein analyzing the input/output utilization comprises comparing the input/output utilization on the at least one virtual input/output logical partition against the input/output capacity of the server.

16. The method of claim 12, wherein the plurality of servers comprise a server farm.

17. The method of claim 16, further comprising presenting a graph containing a plurality of servers comprising a server farm and a summary of utilization for each server in the graph.

18. The method of claim 16, further comprising presenting a graph containing a plurality of server farms and a summary of utilization for each server farm in the graph.

* * * * *